United States Patent [19]

Beldham et al.

[11] Patent Number: 5,059,954

[45] Date of Patent: Oct. 22, 1991

[54] LIQUID LEVEL SENSING SYSTEM

[75] Inventors: Paul M. Beldham, El Toro; Erik W. Jones, Irvine; Larry G. Bremer, Orange, all of Calif.

[73] Assignee: Knight Equipment Corp., Costa Mesa, Calif.

[21] Appl. No.: 633,045

[22] Filed: Dec. 21, 1990

[51] Int. Cl.$^5$ ............................................... G08B 21/00
[52] U.S. Cl. .................................... 340/614; 340/618; 73/302
[58] Field of Search ............... 340/614, 618, 626, 612; 73/302, 290 R, 299

[56] References Cited

U.S. PATENT DOCUMENTS

| | | | |
|---|---|---|---|
| 2,003,759 | 12/1931 | Reichel | 73/302 |
| 2,640,977 | 6/1953 | Parisi . | |
| 3,230,769 | 6/1962 | Carver et al. . | |
| 3,587,316 | 6/1971 | Kapteyn . | |
| 3,834,236 | 9/1974 | Durin | 73/302 |
| 4,002,068 | 1/1977 | Borst | 73/302 |
| 4,199,983 | 4/1980 | Kobayashi et al. | 73/302 |
| 4,204,203 | 5/1980 | Verne | 340/620 |
| 4,480,610 | 11/1984 | Stinson | 73/302 X |
| 4,639,738 | 1/1987 | Young et al. | 73/302 X |

Primary Examiner—Donnie L. Crosland
Assistant Examiner—Jeffery A. Hofsass
Attorney, Agent, or Firm—Gordon L. Peterson

[57] ABSTRACT

A sensing system for detecting a low level of liquid in a container employs an open-ended probe which is partially submerged in the liquid. The probe contains a pressurized compressible fluid, typically air, the pressure of which is related to the level of the liquid in the container, being a function of the static head of the liquid. A pressure switch fluidly connected to the probe is actuated when the pressure in the probe falls below a predetermined level. The pressure switch activates an air pump, which pumps compressed air into the probe to try and restore the predetermined pressure level, and the switch simultaneously actuates a time delay unit, which in turn initiates a time delay period. If pressure in the probe is restored to the predetermined level prior to the expiration of the time delay period, the time delay unit is reset and the air pump is shut off, since restoration of the pressure indicates that the liquid level is not really low, the low pressure condition is caused by a leak or absorption. However, if the pressure in the probe is not restored to the predetermined level when the time delay period expires, an alarm indicating low liquid level in the container is actuated, so that the level may be replenished.

9 Claims, 1 Drawing Sheet

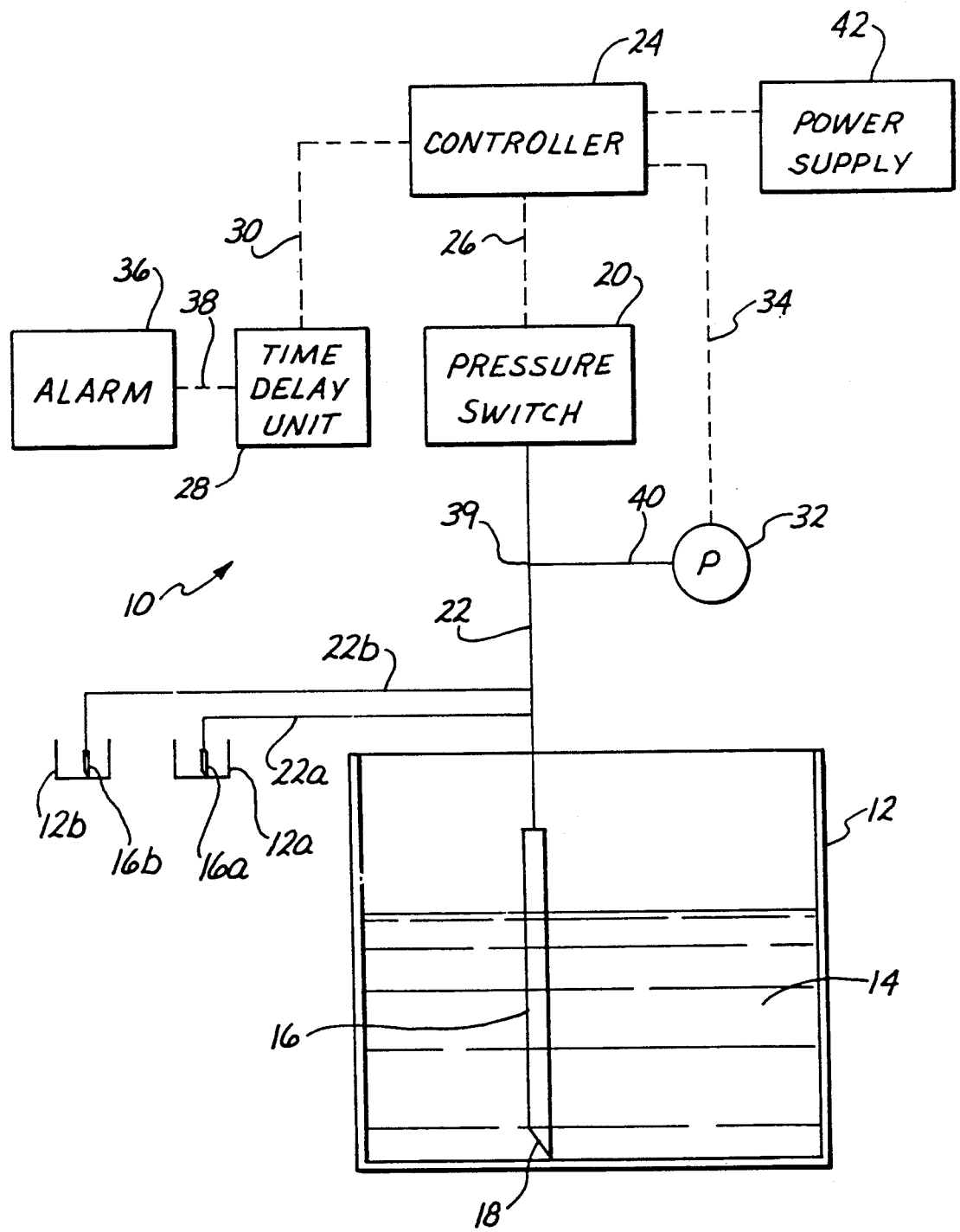

LIQUID LEVEL SENSING SYSTEM

BACKGROUND OF THE INVENTION

1. Technical Field

This invention relates generally to systems for sensing a low liquid level in a container, and more particularly to a new and improved system which minimizes false indications by more accurately monitoring the liquid level.

2. Background Information

There is a great demand for systems which can continuously monitor the level of liquid in a container and provide an immediate indication when the level falls below a desired minimum. Consequently, many such systems exist in the prior art for meeting that demand. In one such system, a probe is submerged into the liquid in a container, with its open lower end contacting the bottom of the container. The probe is coupled to a pressure switch through a fluid conduit. Air in the probe and the conduit is compressed by an amount which is a function of the static head of the liquid. Thus, when the level of the liquid drops, the fluid pressure in the probe drops correspondingly. When the fluid pressure in the probe drops below a predetermined level, the pressure switch is actuated to sound an alarm indicating a low liquid level.

A problem with the prior art system is that, over time, air is absorbed into the medium being monitored and the pressure switch or other system components tend to begin slowly leaking air, and this causes the pressure in the probe to drop. Consequently, when the pressure falls below the predetermined level the pressure switch is actuated and the alarm sounds, even though the liquid level in fact is not low. These false alarms are annoying to the operator of the equipment and cause numerous delays while the liquid level is manually checked. If the system for refilling the container is automated, an overfilling problem may result. Thus, a solution is needed to remedy these false alarms.

SUMMARY OF THE INVENTION

This invention solves the problem outlined above. With this invention, false low level alarms are reduced or eliminated. This is advantageously accomplished by utilizing a system which compensates for the pressure reduction in the probe, which does not result from a reduced level of the medium being monitored, such as system leaks and absorption of air by the medium being monitored.

The liquid level sensing system of this invention includes a probe which is at least partially submerged in the liquid in a container. The probe is filled with a compressible fluid which is preferably a gas such as air. The pressure of the fluid in the probe is related to the level of the liquid in the container, being a function of the static head of the liquid.

If the pressure in the probe drops below a predetermined level, it may be the result of a low level condition or air leakage from the system. To distinguish between the two and filter out the potential false alarm condition, fluid under pressure is supplied to the probe to attempt to bring the pressure in the probe back up to the predetermined level. If the pressure drop was caused by leakage, the pressure in the probe will quickly return to the predetermined level and no low level indication will be provided. However, if the pressure in the probe remains below the predetermined level for a predetermined time, even though pressurized fluid is being supplied to the probe, a low level condition exists and an indication of low liquid level in the container is provided.

According to one aspect of the invention, the pressure is sensed by a pressure switch which is in fluid communication with the probe. The pressure switch is actuated when the fluid pressure in the probe drops below the predetermined level. When the pressure switch is actuated, an air pump is activated to supply compressed air to the probe.

More particularly, a time delay unit initiates a time delay period when the pressure in the probe drops below the predetermined level. The time delay period is preferably, but not necessarily, initiated simultaneously with the pressure in the probe dropping below the predetermined level. If the pressure in the probe remains below the predetermined level when the time delay period expires, the time delay unit activates a low liquid level indicator.

Although the pump could run continuously, preferably, it operates on an as needed basis. If the pump operated continuously, it would continuously bubble gas, such as air, through the liquid being monitored, and this would increase the rate of evaporation of the liquid. This is disadvantageous particularly when the liquid is relatively expensive, such as in the case of laundry detergents or other chemicals. In addition, continuous pump operation increases wear on the pump, reduces pump life and increases the amount of current required to operate the liquid level sensing system.

Preferably, the pump is turned on in response to the pressure dropping below the predetermined level. In a preferred construction, the operation of the pump is initiated simultaneously with the detection that the pressure has dropped below the predetermined level. If the pump is to be operated on an as needed basis, then it is automatically shut off when the fluid pressure in the probe is restored so that it exceeds the predetermined level.

The liquid level sensing system of this invention can be used to sense the level of virtually any liquid such as alcohol, motor oil, detergents, etc. It is particularly adapted for use with liquids, the level of which drops relatively slowly thereby affording a long length of time for a false low level alarm condition due to air leakage from the sensing system. The intermittent pump operating feature also adapts the system for use with liquids which are somewhat costly and would tend to evaporate if air were continuously bubbled through them.

The indication of low liquid level provided by the liquid level sensing system of the this invention can be any condition detectible by a human or any signal or response taken by a machine or electronic device. Most commonly, the indication includes one or more of an audible or visual alarm or automatic refilling of the container.

The above mentioned and other objects and features of this invention and the manner of attaining them will become apparent, and the invention itself will be best understood, by reference to the following description taken in conjunction with the accompanying illustrative drawing.

BRIEF DESCRIPTION OF THE DRAWING

The sole FIGURE is a schematic view showing a liquid level sensing system according to the invention.

DETAILED DESCRIPTION OF THE DRAWING

Referring now to the FIGURE, there is shown a liquid level detection system 10 according to the invention which is adapted for use with a container 12 which contains a certain level of liquid 14. The system 10 includes a probe 16 which is submerged in the liquid, with its lower end 18 being open and in contact with the bottom of the container 12. To assure that the lower end 18 does not become blocked, it is preferably cut at an angle. The probe 16 is coupled to a pressure switch 20 by a conduit 22, and the probe and conduit define a blind passage that terminates at or in the pressure switch. Consequently, the air in the probe 16 and the conduit 22 is compressed by the liquid 14 by an amount which is a function of the level of the liquid in the container 12, and the pressure switch 20 can sense the pressure in the probe.

If desired, additional probes 16a and 16b, which may be identical to the probe 16, are positioned in separate containers 12a and 12b, respectively. The probes 16a and 16b are coupled to the conduits 22 by conduits 22a and 22b, respectively. The probes 16a and 16b perform the same liquid level sensing function in their respective containers 12a and 12b as the probe 16 performs in the container 12. Accordingly, only the container 12 and the probe 16 are discussed in detail herein.

The pressure switch 20 is coupled to an electronic controller 24 by a conductive link 26. Accordingly, the controller 24 can monitor the state of the pressure switch 20.

The controller 24 is also coupled to a time delay unit 28 by a conductive link 30 and to an air pump 32 by a conductive link 34. The time delay unit 28 is coupled to an alarm 36 via a conductor 38. The air pump 32 communicates with the conduit 22 at a summing point 39 through a conduit 40. The conductive link 34 and the conduit 40 form a feedback loop. The liquid level detection system 10 also includes a power supply 42 for supplying electrical power to operate the system.

The controller 24 is preferably electronic, although other kinds of controllers can be employed, if desired. The controller 24 contains electrical components for monitoring the state of the pressure switch 20 and operating the time delay unit 28 and pump 32 in response to the monitored state of the pressure switch. More specifically, with the pressure switch 20 in one state, the controller 24 initiates the time delay unit 28 and initiates operation of the pump 32. With the pressure switch 20 in the other state, it resets the time delay unit 28 and terminates operation of the pump 32.

In operation, the liquid 14 enters the open lower end 18 of the probe 16 and compresses the air in the probe and the conduit 22 by an amount which is a function of the static head of the liquid 14. The pressure switch 20 detects the pressure in the conduit 22 and is calibrated to be actuated if the pressure drops below a predetermined level which corresponds to the minimum desired level of liquid in the container. Because the pressure switch 20 is coupled to the probes 16, 16a and 16b, it can simultaneously monitor the liquid levels in the associated containers 12, 12a and 12b. The pressure switch 20 will be actuated if the pressure in any of the probes 16, 16a and 16b drops below a predetermined level which corresponds to the minimum desired level of liquid in that container.

When the switch 20 is actuated, the controller 24 initiates the time delay unit 28 to start a time delay period, which may be one or two seconds in duration. Simultaneously, the controller 24 activates the pump 32, which begins pumping air through fluid conduit 40 into the conduit 22 and the probes 16, 16a and 16b. If the reduction in fluid pressure in the conduit 22 is due to factors such as air absorption or an air leak in the pressure switch 20 or other system components, the pump 32 should quickly be able to restore the predetermined pressure level and de-actuate the pressure switch 20 before the time delay times out, in which case the controller 24 would reset the time delay unit 28 and the alarm 36 would not sound. However, if the reduction in fluid pressure in the conduit 22 is due to a low liquid level in the tanks 12, 12a or 12b, the pump will be unable to restore the predetermined pressure level, since the fluid pressure in the probe 16 and conduit 22 cannot exceed the static head pressure of the liquid 14. When the time delay unit 28 times out, time delay unit will actuate the alarm 36 and the operator will be notified of the low liquid level and have the opportunity to replenish the liquid in the tank.

This system provides a number of advantages. For example, the use of the pump 32 to restore the fluid pressure level to the predetermined level prevents or reduces the occurrence of false alarms. This keeps the operator from wasting his or her time attempting to replenish a liquid level which is not really low. An even greater advantage is gained, however, as a result of the time delay unit 28 which distinguishes between a false condition and a low level condition.

Use of the pump 32 without employment of the feedback loop and running the pump continuously, not only wastes energy, but also causes an increased evaporation of the liquid in the containers 12, 12a and 12b. If the fluid pressure in the conduit 22 and the probes 16, 16a and 16b is at the same level as the static head of the liquid, further pumping of air into the conduit 22 will cause the air to exit the open ends 18 of the probes and to bubble to the liquid surface. This bubbling increases liquid evaporation. If the liquid is expensive, such as detergent, this can be costly. In any event, such bubbling increases the frequency with which the liquid level in the tank must be replenished. On the other hand, employment of the feedback feature allows the pump to be activated only in the event of a low pressure condition. In the event the low pressure condition is the result of a leak or air absorption, the pump is turned off as soon as the proper pressure level is restored, and remains off until the pressure again falls below the predetermined level.

Although an exemplary embodiment of the invention has been shown and described, many changes, modifications, and substitutions may be made by one having ordinary skill in the art without necessarily departing from the spirit and scope of the invention. For example, instead of actuating the alarm 36, for notifying an operator of the low liquid condition so that he can manually replenish the tank, the time delay unit 28 could actuate a controller which would automatically replenish the tank. The pump 32 need not pump air into the conduit 22, but could pump any compressible fluid, depending upon system needs and application.

What is claimed is:

1. A liquid level sensing system for sensing a liquid level in a container, comprising:
   a probe at least partially receivable in the container, said probe being adapted to have a compressible fluid therein with the pressure of the fluid being related to the level of the liquid in the container;

means responsive to the pressure in the probe dropping below a predetermined level for supplying fluid under pressure to the probe; and means responsive to the pressure in the probe remaining below said predetermined level for a predetermined time to provide an indication of low liquid level in the container.

2. The liquid level sensing system as recited in claim 1 wherein said means for supplying fluid under pressure to the probe comprises:

a pressure switch in fluid communication with said probe, said pressure switch being actuated when the fluid pressure in said probe drops below said predetermined level; and an air pump in fluid communication with said probe, said air pump being activated to supply compressed air to said probe in response to actuation of said pressure switch.

3. The liquid level sensing system as recited in claim 2 wherein said means responsive to the pressure in the probe remaining below said predetermined level for a predetermined time comprises:

a time delay unit, said time delay unit initiating a time delay period having a duration of said predetermined time simultaneously with the activation of said fluid supplying means;

a low liquid level indicator; and said time delay unit activating the low liquid level indicator if the pressure in the probe remains below said predetermined level when the time delay period expires.

4. The liquid level sensing system as recited in claim 1 wherein said means responsive to the pressure in the probe remaining below said predetermined level for a predetermined time comprises a time delay unit, said time delay unit initiating a time delay period having a duration of said predetermined time when said pressure in the probe drops below the predetermined level, said time delay period being initiated simultaneously with the supplying of fluid under pressure to the probe.

5. A liquid level sensing system for sensing a liquid level in a container comprising:

a probe at least partially receivable in the container, said probe having an open lower end and having a compressible gas therein, with the pressure of the gas being related to the level of the liquid in the container;

a pressure switch in fluid communication with said probe, said pressure switch being actuated when the pressure in the probe drops below a predetermined level; and a pressurized fluid supply means, responsive to the actuation of said pressure switch, for supplying pressurized fluid to said probe, said pressurized fluid supply means ceasing supply of pressurized fluid to the probe when the fluid pressure in said probe again exceeds the predetermined level.

6. The liquid level sensing system of claim 5 including a time delay unit activated by said pressure switch when said switch is actuated by a low pressure condition, an indicator of low liquid level activated by said time delay unit if a predetermined period of time passes without restoration of the predetermined pressure level in said probe.

7. A liquid level sensing system as defined in claim 5 wherein the container is a first container and the probe is a first probe, said liquid level sensing system includes a second probe at least partially receivable in a second container, the second probe having a compressible gas therein with the pressure of the gas being related to the level of the liquid in the second container, and means for coupling the second probe to the pressure switch.

8. A method for sensing liquid level in a container comprising the steps of:

inserting a probe having a compressible fluid therein into the liquid in said container, the pressure of the compressible fluid being related to the level of the liquid in the container;

sensing the fluid pressure in said probe;

supplying pressurized fluid to said probe when the fluid pressure therein falls below a predetermined level; and indicating a low liquid level in the container if the fluid pressure in said probe remains below a predetermined level for a predetermined period of time.

9. The method recited in claim 8 including ceasing supply of pressurized fluid to said probe when the fluid pressure therein again exceeds the predetermined level.

* * * * *